United States Patent
Tamaizumi et al.

(10) Patent No.: US 11,414,125 B2
(45) Date of Patent: Aug. 16, 2022

(54) STEERING CONTROLLER AND STEERING CONTROL METHOD

(71) Applicants: JTEKT CORPORATION, Osaka (JP); JTEKT EUROPE S.A.S., Irigny (FR)

(72) Inventors: Terutaka Tamaizumi, Okazaki (JP); Tahar Slama, Ecully (FR); Pascal Moulaire, Salvagny (FR); Pierre Larminy, Oullins (FR)

(73) Assignees: JTEKT CORPORATION, Kariya (JP); JTEKT EUROPE S.A.S., Irigny (FR)

( * ) Notice: Subject to any disclaimer, the term of this patent is extended or adjusted under 35 U.S.C. 154(b) by 482 days.

(21) Appl. No.: 16/697,851

(22) Filed: Nov. 27, 2019

(65) Prior Publication Data

US 2020/0172156 A1 Jun. 4, 2020

(30) Foreign Application Priority Data

Dec. 4, 2018 (JP) .............................. JP2018-227226

(51) Int. Cl.
*H02P 6/08* (2016.01)
*B62D 5/04* (2006.01)

(52) U.S. Cl.
CPC ......... *B62D 5/0463* (2013.01); *B62D 5/0424* (2013.01); *H02P 6/08* (2013.01); *H02P 2205/05* (2013.01)

(58) Field of Classification Search
CPC ....... B62D 5/0463; B62D 5/0424; H02P 6/08; H02P 2205/05
USPC ............................... 318/400.15, 671; 701/41
See application file for complete search history.

(56) References Cited

U.S. PATENT DOCUMENTS

| 10,286,946 B2 * | 5/2019 | Nishimura | ........... B62D 15/025 |
| 2020/0039576 A1 * | 2/2020 | Shoji | .................... B62D 5/0463 |

FOREIGN PATENT DOCUMENTS

| CN | 110027609 A | * | 7/2019 | ......... B62D 15/0235 |
| EP | 3213979 A1 | * | 9/2017 | ........... B62D 15/025 |
| JP | 2006-151360 A | | 6/2006 | |
| WO | WO-2013172026 A1 | * | 11/2013 | ............. B62D 5/003 |

* cited by examiner

*Primary Examiner* — Jorge L Carrasquillo
(74) *Attorney, Agent, or Firm* — Oliff PLC

(57) ABSTRACT

A steering controller includes processing circuitry. The processing circuitry is configured to execute an operation process for calculating a torque command value corresponding to a sum of an amount by which the steering-side operation amount is converted into the torque required for the electric motor and an amount by which the steerable wheel-side operation amount is converted into the torque required for the electric motor and operate a drive circuit of the electric motor to adjust the torque of the electric motor to the torque command value.

5 Claims, 2 Drawing Sheets

STEERING CONTROLLER AND STEERING CONTROL METHOD

BACKGROUND

1. Field

The present disclosure relates to a steering controller and a steering control method for operating a steering actuator that steers steerable wheels and incorporates an electric motor.

2. Description of Related Art

Japanese Laid-Open Patent Publication No. 2006-151360 describes an example of a steering controller for setting the torque of an electric motor incorporated in a steering actuator that steers steerable wheels. The steering controller executes feedback control to adjust a steering angle detected by a steering sensor to a target steering angle. The torque of the electric motor is set based on an operation amount used for the feedback control. The target steering angle is set based on a steering torque detected by a steering torque sensor.

Noise is superimposed on the state quantities detected by various sensors. The state quantities include, for example, a steering torque detected by the steering torque sensor and a steering angle detected by the steering sensor. Thus, the superimposition of the noise of the steering torque and the noise of the steering angle may increase the influence of noise on a control unit that executes the feedback control. Thus, it is difficult to improve the responsivity of the feedback control. As a result, it is difficult to improve the responsivity of control that steers the steerable wheels.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples of the present disclosure will now be described.

Example 1: A steering controller for operating a steering actuator that incorporates an electric motor and steers a steerable wheel is provided. The steering controller includes processing circuitry configured to execute a torque feedback process for calculating a steering-side operation amount, the steering-side operation amount being used for feedback control that adjusts a steering torque input by a driver to a target torque and being convertible into torque required for the electric motor, an angle command value calculation process for calculating an angle command value based on the steering-side operation amount, the angle command value being a command value of a convertible angle that is convertible into a steerable angle of the steerable wheel, an angle feedback control process for calculating a steerable wheel-side operation amount, the steerable wheel-side operation amount being used for feedback control that adjusts the convertible angle to the angle command value and being convertible into the torque required for the electric motor, and an operation process for calculating a torque command value corresponding to a sum of an amount by which the steering-side operation amount is converted into the torque required for the electric motor and an amount by which the steerable wheel-side operation amount is converted into the torque required for the electric motor and operating a drive circuit of the electric motor to adjust the torque of the electric motor to the torque command value.

In the above-described configuration, noise may be superimposed on the steering torque that is an input of the torque feedback process. The angle command value is calculated based on the steering-side operation amount, which is calculated through the torque feedback process. The angle feedback process is performed based on the angle command value. Thus, the angle feedback process is affected by the noise of the steering torque included in the angle command value in addition to the noise superimposed on the convertible angle. Thus, as compared to the torque feedback process, the responsivity of the angle feedback process cannot be increased easily. In the above-described configuration, the torque command value of the electric motor corresponds to both the steering-side operation amount and the steerable wheel-side operation amount instead of being determined only from the steerable wheel-side operation amount. This increases the responsivity of control.

Example 2: In the steering controller according to Example 1, the angle feedback control process includes an angle estimation process for calculating an estimated value of the convertible angle based on the convertible angle and the torque required for the electric motor and a process for adjusting the estimated value to the angle command value through feedback control.

In the above-described configuration, the state quantity used for the feedback control is the estimated value estimated through the angle estimation process instead of the convertible angle based on a sensor detection value. This reduces the influence of the noise superimposed on the convertible angle on the angle feedback process.

Example 3: In the steering controller according to Example 1 or 2, the angle feedback control process includes calculating a feedback operation amount using a differential element, obtaining an additional value by adding, to the feedback operation amount, a feedforward operation amount based on a second order time differential value of the angle command value, and calculating the steerable wheel-side operation amount based on the additional value.

In the above-described configuration, the feedback operation amount is calculated using a differential element. Thus, as compared to when the feedback operation amount is calculated without using a differential element, the responsivity of control based on the feedback operation amount is improved. Further, in the above-described configuration, the steerable wheel-side operation amount is calculated using the feedforward operation amount. Thus, as compared to when the steerable wheel-side operation amount is calculated without using the feedforward operation amount, the responsivity of control based on the steerable wheel-side operation amount is improved.

Example 4: In the steering controller according to any one of Examples 1 to 3, the processing circuitry is configured to execute a target torque calculation process for calculating the target torque, and the target torque calculation process includes obtaining a conversion amount by converting each of the steering-side operation amount and the steering torque into force acting on a same object and calculating the target torque based on a sum of the conversion amounts.

The steering-side operation amount can be converted into the torque required for the electric motor. Thus, the steering-side operation amount and the steering torque determine the force applied from the vehicle to steer the steerable wheel. This force determines the side force. The target torque required to improve the steering feeling by the driver tends to be determined by the side force. Thus, in the above-described configuration, determining the target torque based on the sum facilitates the designing of the target torque calculation process.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A steering controller 40 according to an embodiment will now be described with reference to the drawings.

Figure 1:
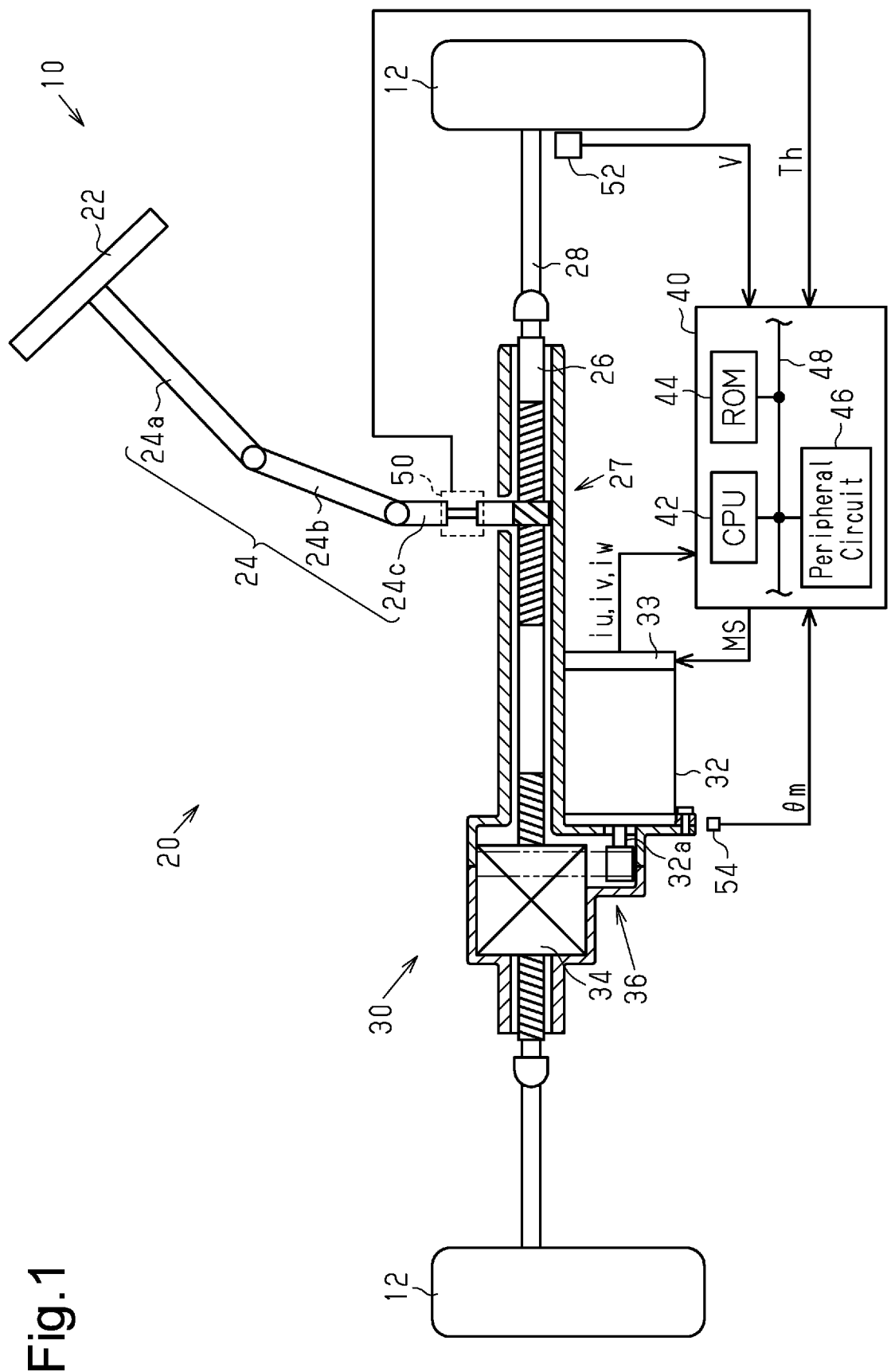
FIG. 1 is a diagram showing an electric power steering according to an embodiment.

As shown in FIG. 1, an electric power steering 10 includes a steering mechanism 20, which steers steerable wheels 12 based on the operation of a steering wheel 22 performed by a driver, and a steering actuator 30, which electrically steers the steerable wheels 12.

The steering mechanism 20 includes the steering wheel 22, a steering shaft 24, which is fixed to the steering wheel 22, and a rack-and-pinion mechanism 27. The steering shaft 24 includes a column shaft 24a, which is coupled to the steering wheel 22, an intermediate shaft 24b, which is coupled to the lower end of the column shaft 24a, and a pinion shaft 24c, which is coupled to the lower end of the intermediate shaft 24b. The lower end of the pinion shaft 24c is coupled to a rack shaft 26, which is a steerable shaft, by the rack-and-pinion mechanism 27. The rack-and-pinion mechanism 27 includes the pinion shaft 24c and the rack shaft 26. The opposite ends of the rack shaft 26 are respectively coupled to the left and right steerable wheels 12 by a tie rod 28. Thus, the rack-and-pinion mechanism 27 converts rotation of the steering wheel 22 (i.e., rotation of the steering shaft 24) into reciprocation of the rack shaft 26 in the axial direction. The reciprocation is transmitted to the steerable wheels 12 from the tie rod 28, which is coupled to the opposite ends of the rack shaft 26, thereby changing the steerable angles of the steerable wheels 12. The axial direction of the rack shaft 26 corresponds to the sideward direction in FIG. 1.

The steering actuator 30 shares the rack shaft 26 with the steering mechanism 20. Further, the steering actuator 30 includes an electric motor 32, an inverter 33, a ball screw mechanism 34, and a belt reduction drive 36. The electric motor 32 is the generator of power that steers the steerable wheels 12. In the present embodiment, a three-phase surface permanent magnet synchronous motor (SPMSM) is exemplified as the electric motor 32. The ball screw mechanism 34 is arranged around the rack shaft 26 and coupled to the rack shaft 26. The belt reduction drive 36 transmits rotation force of an output shaft 32a of the electric motor 32 to the ball screw mechanism 34. The ball screw mechanism 34 and the belt reduction drive 36 convert the rotation force of the output shaft 32a of the electric motor 32 into force that reciprocates the rack shaft 26 in the axial direction. The axial force given to the rack shaft 26 steers the steerable wheels 12.

The steering controller 40 controls the steerable wheels 12. The steering controller 40 operates the steering actuator 30 in order to control a steerable angle, which is the control amount of each steerable wheel 12. When controlling the control amount, the steering controller 40 refers to the state quantities detected by various sensors. The state quantities include a steering torque Th, which is detected by a torque sensor 50, and a vehicle speed V, which is detected by a vehicle speed sensor 52. The steering torque Th is input by the driver via the steering wheel 22. The state quantities also include a rotation angle θm of the output shaft 32a, which is detected by a rotation angle sensor 54. The state quantities further include current iu, current iv, and current iw, which flow through the electric motor 32. The current iu, the current iv, and the current iw can be detected based on voltage drop caused by the shunt resistor of each leg of the inverter 33.

The steering controller 40 includes a CPU 42, a ROM 44, and a peripheral circuit 46. The CPU 42, the ROM 44, and the peripheral circuit 46 are connected to one another by a communication line 48. The peripheral circuit 46 includes various circuits such as a circuit that generates a clock signal specifying an internal operation, a power supply circuit, and a reset circuit.

Figure 2:
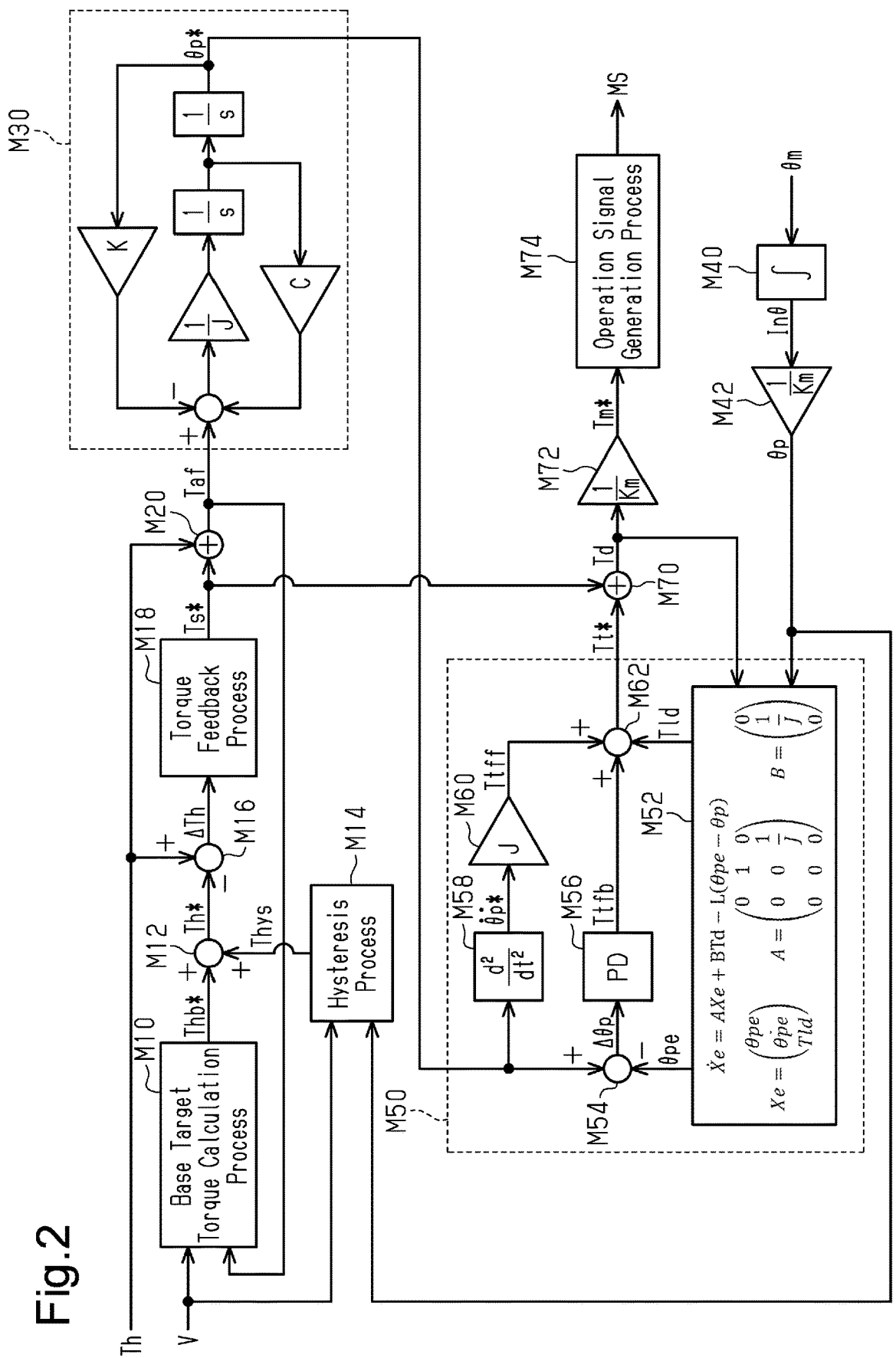
FIG. 2 is a block diagram illustrating processes executed by the steering controller of the embodiment.

FIG. 2 shows part of the processes executed by the steering controller 40. The processes of FIG. 2 are implemented by the CPU 42 executing programs stored in the ROM 44.

A base target torque calculation process M10 is a process for calculating a base target torque Thb* based on an axial force Taf, which will be described later. The base target torque Thb* is the base value of a target torque Th*, which should be input by the driver to the steering shaft 24 via the steering wheel 22. The axial force Taf is applied to the rack shaft 26 in the axial direction. The axial force Taf has an amount corresponding to a side force acting on each steerable wheel 12. Thus, the side force can be obtained from the axial force Taf. It is desired that the side force be used to determine the torque that should be input by the driver to the steering shaft 24 via the steering wheel 22. Accordingly, the base target torque calculation process M10 calculates the base target torque Thb* in accordance with the side force obtained from the axial force Taf.

More specifically, even if the absolute value of the axial force Taf is the same, the base target torque calculation process M10 calculates the absolute value of the base target torque Thb* to be smaller when the vehicle speed V is low than when the vehicle speed V is high. This can be achieved by, for example, the CPU 42 obtaining the base target torque Thb* through map calculation in a state in which map data is stored in the ROM 44 in advance. In the map data, for example, the axial force Taf or a lateral acceleration obtained from the axial force Taf, and the vehicle speed V are set as input variables, and the base target torque Thb* is set as an output variable. The map data refers to a data set of discrete values of input variables and values of output variables each corresponding to a value of the input variables.

For example, when the value of an input variable matches one of the values of input variable on the map data, the map calculation uses the value of the corresponding output variable of the map data as the calculation result. When the value of the input variable does not match any of the values of the input variable on the map data, a value obtained by interpolation of multiple values of the output variable included in the map data is used as the calculation result.

A hysteresis process M14 is a process for calculating and outputting a hysteresis correction amount Thys, which is used to correct the base target torque Thb*, based on a pinion angle θp, which is the rotation angle of the pinion shaft 24c. The pinion angle θp is a convertible angle that can be converted into the steerable angle of each steerable wheel 12. More specifically, the hysteresis process M14 includes a process for calculating the hysteresis correction amount Thys such that the absolute value of the target torque Th* is larger when steering the steering wheel 22 than when returning the steering wheel 22. The hysteresis process M14 distinguishes the steering period from the returning period of the steering wheel 22 based on, for example, changes in the pinion angle θp. The hysteresis process M14 includes a process for variably setting the hysteresis correction amount Thys in accordance with the vehicle speed V.

An addition process M12 is a process for calculating the target torque Th* by adding the hysteresis correction amount Thys to the base target torque Thb*.

A difference calculation process M16 is a process for calculating a difference ΔTh by subtracting the target torque Th* from the steering torque Th.

A torque feedback process M18 is a process for calculating a steering-side operation amount Ts* based on the difference ΔTh. The steering-side operation amount Ts* is an operation amount for adjusting the steering torque Th to the target torque Th*. The steering-side operation amount Ts* includes an operation amount used for feedback control that adjusts the steering torque Th to the target torque Th*, i.e., a feedback operation amount. The feedback operation amount is used to increase a required torque for the electric motor 32 when, for example, the steering torque Th and the target torque Th* are both positive and the steering torque Th is larger than the target torque Th*. The steering-side operation amount Ts* is an amount corresponding to the required torque for the electric motor 32 and is also an amount converted into torque applied to the steering shaft 24 in the present embodiment.

An axial force calculation process M20 is a process for calculating the axial force Taf by adding the steering torque Th to the steering-side operation amount Ts*. The steering torque Th is applied to the steering shaft 24. Thus, in the present embodiment, the axial force Taf has a value obtained by converting, into the torque applied to the steering shaft 24, force applied in the axial direction of the rack shaft 26.

An angle command value calculation process M30 is a process for calculating a pinion angle command value θp*, which is a command value of the pinion angle θp, based on the axial force Taf. More specifically, the angle command value calculation process M30 is a process for calculating the pinion angle command value θp* using a model expression represented by the following expression (c1).

$$Taf = K \cdot \theta p^* + C \cdot \theta p^{*\prime} + J \cdot \theta p^{*\prime\prime} \quad (c1)$$

The model represented by the expression (c1) is obtained by modelling a value indicated by the pinion angle θp when the steering shaft 24 receives the torque having the same amount as the axial force Taf. In the model represented by the expression (c1), a viscosity coefficient C is obtained by modelling, for example, friction of the electric power steering 10. An inertia coefficient J is obtained by modelling the inertia of the electric power steering 10. A spring coefficient K is obtained by modelling the specification of the suspension or wheel alignment of a vehicle incorporating the electric power steering 10.

An integration process M40 is a process for calculating an integration value Inθ of the rotation angle θm of the electric motor 32. In the present embodiment, the steerable angle of the steerable wheel 12 is set to 0 when the vehicle travels straight, and the integration value Inθ is set to 0 when the steerable angle is 0. A conversion process M42 is a process for calculating the pinion angle θp by dividing the integration value Inθ by a deceleration ratio Km from the steering shaft 24 to the electric motor 32.

An angle feedback process M50 is a process for calculating a steerable wheel-side operation amount Tt*, which is an operation amount for adjusting the pinion angle θp to the pinion angle command value θp*. The angle feedback process M50 includes a disturbance observer M52, which estimates a disturbance torque Tld by setting the pinion angle θp as an input, that is, based on the pinion angle θp. The disturbance torque Tld is excluded from the torque that affects the pinion angle θp other than the torque output by the electric motor 32.

In the present embodiment, an estimated disturbance torque Tld is converted into the torque added to the steering shaft 24. The disturbance observer M52 estimates the disturbance torque Tld with the following expression (c2) using a required torque Td for the electric motor 32, which has been converted into the torque added to the steering shaft 24.

$$J \cdot \theta p^{*\prime\prime} = d + Tld \quad (c2)$$

More specifically, in the present embodiment, the disturbance ob server M52 calculates the estimated disturbance torque Tld and an estimated value θpe with the following expression (c3) using a matrix L with three rows and one column, which specifies the estimated value θpe of the pinion angle θp, the required torque Td, and an observer gain.

$$\dot{X}e = AXe + BTd - L(\theta pe - \theta p) \quad (c3)$$

$$Xe = \begin{pmatrix} \theta pe \\ \dot{\theta} pe \\ Tld \end{pmatrix} \quad A = \begin{pmatrix} 0 & 1 & 0 \\ 0 & 0 & \frac{1}{J} \\ 0 & 0 & 0 \end{pmatrix} \quad B = \begin{pmatrix} 0 \\ \frac{1}{J} \\ 0 \end{pmatrix}$$

A difference calculation process M54 is a process for obtaining a difference Δθp by subtracting the estimated value θpe from the pinion angle command value θp*.

A feedback term calculation process M56 is a process for calculating a feedback operation amount Ttfb, which is the sum of the output value of a proportional element having the difference Δθp as an input and the output value of a differential element having the differential value of the difference Δθp as an input. That is, the feedback operation amount Ttfb is the sum of a proportional element obtained in accordance with the difference Δθp and a differential element obtained in accordance with the differential value of the difference Δθp.

A second order differential process M58 is a process for calculating a second order time differential value of the pinion angle command value θp*. A first feedforward term calculation process M60 is a process for calculating a first feedforward operation amount Ttff by multiplying an output value of the second order differential process M58 by the inertia coefficient J. A two-degree-of-freedom operation amount calculation process M62 is a process for calculating the steerable wheel-side operation amount Tt* by adding the feedback operation amount Ttfb, the first feedforward operation amount Ttff, and the estimated disturbance torque Tld, which is a second feedforward operation amount.

An addition process M70 is a process for calculating the required torque Td for the electric motor 32 by adding the steering-side operation amount Ts* and the steerable wheel-side operation amount Tt*.

A conversion process M72 is a process for converting the required torque Td into a motor torque command value Tm*, which is a command value of the torque for the electric motor 32, by dividing the required torque Td by the deceleration ratio Km.

An operation signal generation process M74 is a process for generating and outputting an operation signal MS of the inverter 33, which is used to adjust the torque output by the electric motor 32 to the motor torque command value Tm*.

The operation and advantage of the present embodiment will now be described.

The CPU 42 calculates the pinion angle command value θp* based on the axial force Taf and adjusts the pinion angle θp to the pinion angle command value θp*. Thus, since each steerable wheel 12 can be steered in accordance with behavior hypothesized in the model expression of the above-described expression (c1), the influence of a reaction force added to the steerable wheel 12 by a road surface is reduced. Noise is superimposed on the pinion angle θp. Further, the pinion angle command value θp* is affected by the noise superimposed on the steering torque Th. This makes it difficult to improve the responsivity of the angle feedback process M50.

In the present embodiment, the value obtained by adding the steering-side operation amount Ts* to the steerable wheel-side operation amount Tt* is set as the required torque Td, instead of setting the steerable wheel-side operation amount Tt* calculated by the angle feedback process M50 as the required torque Td. Although affected by the noise superimposed on the steering torque Th, the torque feedback process M18 is not affected by noise superimposed on the pinion angle θp. This improves the responsivity more easily than the angle feedback process M50. Thus, as compared to when the steerable wheel-side operation amount Tt* is set as the required torque Td, the required torque Td can be set to an amount with a high responsivity.

Correspondence

The correspondence between the items in the above embodiments and the items described in the above-described SUMMARY is as follows. In the following description, the correspondence is shown for each of the numbers in the examples described in the SUMMARY.

[1] In Example 1, the "convertible angle" corresponds to the pinion angle θp. The "operation process" corresponds to the addition process M70, the conversion process M72, and the operation signal generation process M74. The "drive circuit" corresponds to the inverter 33.

[2] In Example 2, the "angle estimation process" corresponds to the disturbance observer M52.

[3] In Example 3, the "feedforward operation amount based on the second order time differential value" corresponds to the first feedforward operation amount Ttff.

[4] The content of the process in Example 4 corresponds to the fact that the axial force Taf is used in the base target torque calculation process M10. The "force acting on a same object" corresponds to the torque acting on the steering shaft 24.

Modifications

At least one of the features of the above-described embodiment may be modified as follows.

Angle Command Value Calculation Process

In the above-described embodiment, the pinion angle command value θp* is calculated using the axial force Taf as an input based on the expression (c1). However, the pinion angle command value θp* does not have to be calculated in this manner. For example, the pinion angle command value θp* may be calculated using the steering-side operation amount Ts* as an input (based on the steering-side operation amount Ts*) instead of the axial force Taf.

Disturbance Observer

The estimated disturbance torque Tld does not have to be calculated in the manner illustrated in the above-described embodiment. For example, the estimated disturbance torque Tld may be calculated based on the expression (c2) by subtracting the required torque Td from a value obtained by multiplying the second order time differential value of the pinion angle command value θp* by the inertia coefficient J. Alternatively, the estimated disturbance torque Tld may be calculated by subtracting the required torque Td from a value obtained by multiplying the second order time differential value of the pinion angle θp by the inertia coefficient J. As another option, the estimated disturbance torque Tld may be calculated by subtracting the required torque Td from a value obtained by multiplying the second order time differential value of the estimated value θpe by the inertia coefficient J.

Angle Feedback Process

In the above-described embodiment, the first feedforward operation amount Ttff is calculated based on a second order time differential value of the pinion angle command value θp*. Instead, the first feedforward operation amount Ttff may be calculated based on the pinion angle θp.

The difference Δθp, which is an input for the feedback term calculation process M56, is not limited to the difference between the pinion angle command value θp* and the estimated value θpe. For example, the difference Δθp may be the difference between the pinion angle command value θp* and the pinion angle θp.

For example, in the two-degree-of-freedom operation amount calculation process M62, the first feedforward operation amount Ttff does not have to be added to the feedback operation amount Ttfb. Further, in the two-degree-of-freedom operation amount calculation process M62, the estimated disturbance torque Tld does not have to be added to the feedback operation amount Ttfb.

For example, it is desired that when the difference Δθp is set to the difference between the pinion angle command value θp* and the pinion angle θp and the steerable wheel-side operation amount Tt* does not include the estimated disturbance torque Tld, an integral element be included in the feedback term calculation process M56 in order to reduce a steady-state error between the pinion angle θp and the pinion angle command value θp*. Even in a case in which the steerable wheel-side operation amount Tt* includes the estimated disturbance torque Tld, it is desired that an integral element be included in the feedback term calculation process M56 when integral calculation is not used to calculate the estimated disturbance torque Tld as described in the section of Disturbance Observer.

Convertible Angle

In the above-described embodiment, the pinion angle θp is used as the convertible angle. Instead, for example, the steerable angle of the steerable wheel may be used as the convertible angle.

Steering-Side Operation Amount

In the above-described embodiment, the steering-side operation amount Ts* is converted into the torque of the steering shaft 24. Instead, for example, the steering-side operation amount Ts* may be converted into the torque of the electric motor 32.

Steerable Wheel-Side Operation Amount

In the above-described embodiment, the steerable wheel-side operation amount Tt* is converted into the torque of the steering shaft 24. Instead, for example, the steerable wheel-side operation amount Tt* may be converted into the torque of the electric motor 32.

Target Torque Calculation Process

The base target torque calculation process M10 is not limited to a process for calculating the base target torque Thb* in accordance with the axial force Taf and the vehicle speed V. Instead, for example, the base target torque calculation process M10 may be a process for calculating the base target torque Thb* only based on the axial force Taf.

The base target torque Thb* does not have to be corrected with the hysteresis correction amount Thys.

Base Target Torque

The base target torque Thb* does not have to be obtained based on the axial force Taf. Instead, for example, an assist torque may be calculated based on the steering torque Th, and the base target torque Thb* may be calculated based on the sum of the assist torque and the steering torque.

Steering Controller

The steering controller is not limited to a device that includes the CPU 42 and the ROM 44 and executes software processing. For example, a dedicated hardware circuit (such as an ASIC) may be provided that executes at least part of the software processes executed in the above-described embodiment. That is, the steering controller may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above-described processes may be executed in any manner as long as the processes are executed by processing circuitry that includes at least one of a set of one or more software processing circuits and a set of one or more dedicated hardware circuits.

Electric Motor, Drive Circuit

The electric motor is not limited to a SPMSM and may be an interior permanent magnet synchronous motor (IPMSM). The electric motor is not limited to a synchronous motor and may be an induction motor. Alternatively, the electric motor may be, for example, a brushed direct-current electric motor. In this case, an H bridge circuit simply needs to be employed for the drive circuit.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A steering controller for operating a steering actuator that incorporates an electric motor and steers a steerable wheel, wherein
the steering controller comprises processing circuitry configured to execute:
a torque feedback process for calculating a steering-side operation amount, the steering-side operation amount being used for feedback control that adjusts a steering torque input by a driver to a target torque and being convertible into torque required for the electric motor;
an angle command value calculation process for calculating an angle command value based on the steering-side operation amount, the angle command value being a command value of a convertible angle that is convertible into a steerable angle of the steerable wheel;
an angle feedback control process for calculating a steerable wheel-side operation amount, the steerable wheel-side operation amount being used for feedback control that adjusts the convertible angle to the angle command value and being convertible into the torque required for the electric motor; and
an operation process for calculating a torque command value corresponding to a sum of an amount by which the steering-side operation amount is converted into the torque required for the electric motor and an amount by which the steerable wheel-side operation amount is converted into the torque required for the electric motor and operating a drive circuit of the electric motor to adjust the torque of the electric motor to the torque command value.

2. The steering controller according to claim 1, wherein the angle feedback control process includes an angle estimation process for calculating an estimated value of the convertible angle based on the convertible angle and the torque required for the electric motor, and a process for adjusting the estimated value to the angle command value through feedback control.

3. The steering controller according to claim 1, wherein the angle feedback control process includes calculating a feedback operation amount using a differential element, obtaining an additional value by adding, to the feedback operation amount, a feedforward operation amount based on a second order time differential value of the angle command value, and calculating the steerable wheel-side operation amount based on the additional value.

4. The steering controller according to claim 1, wherein the processing circuitry is configured to execute a target torque calculation process for calculating the target torque, and the target torque calculation process includes obtaining a conversion amount by converting each of the steering-side operation amount and the steering torque into force acting on a same object, and calculating the target torque based on a sum of the conversion amounts.

5. A steering control method for operating a steering actuator that incorporates an electric motor and steers a steerable wheel, the steering control method comprising:

calculating a steering-side operation amount, the steering-side operation amount being used for feedback control that adjusts a steering torque input by a driver to a target torque and being convertible into torque required for the electric motor;

calculating an angle command value based on the steering-side operation amount, the angle command value being a command value of a convertible angle that is convertible into a steerable angle of the steerable wheel;

calculating a steerable wheel-side operation amount, the steerable wheel-side operation amount being used for feedback control that adjusts the convertible angle to the angle command value and being convertible into the torque required for the electric motor; and calculating a torque command value corresponding to a sum of an amount by which the steering-side operation amount is converted into the torque required for the electric motor and an amount by which the steerable wheel-side operation amount is converted into the torque required for the electric motor and operating a drive circuit of the electric motor to adjust the torque of the electric motor to the torque command value.

* * * * *